United States Patent
Pol et al.

(10) Patent No.: US 11,545,722 B2
(45) Date of Patent: Jan. 3, 2023

(54) SEPARATORS FOR ELECTROCHEMICAL CELLS AND METHODS OF MAKING THE SAME

(71) Applicant: Purdue Research Foundation, West Lafayette, IN (US)

(72) Inventors: Vilas Ganpat Pol, West Lafayette, IN (US); Patrick J H Kim, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 198 days.

(21) Appl. No.: 16/820,235

(22) Filed: Mar. 16, 2020

(65) Prior Publication Data

US 2020/0295333 A1    Sep. 17, 2020

Related U.S. Application Data

(60) Provisional application No. 62/819,153, filed on Mar. 15, 2019.

(51) Int. Cl.
*H01M 50/449* (2021.01)
*H01M 4/38* (2006.01)
*H01M 10/0569* (2010.01)
*H01M 10/0567* (2010.01)
*H01M 10/052* (2010.01)
(Continued)

(52) U.S. Cl.
CPC ......... *H01M 50/449* (2021.01); *H01M 4/382* (2013.01); *H01M 10/052* (2013.01); *H01M 10/0567* (2013.01); *H01M 10/0568* (2013.01); *H01M 10/0569* (2013.01); *H01M 50/411* (2021.01); *H01M 50/431* (2021.01); *H01M 2300/0025* (2013.01)

(58) Field of Classification Search
None
See application file for complete search history.

(56) References Cited

U.S. PATENT DOCUMENTS 5,290,645 A * 3/1994 Tanaka ............... H01M 50/454
                                                     429/144
5,830,603 A * 11/1998 Oka .................... H01M 50/449
                                                     204/296

(Continued)

OTHER PUBLICATIONS

Kim, P. J., Pol, V. G., Adv. Energy Mater. 2018, 8, 1802665. https://doi.org/10.1002/aenm.201802665 (Year: 2018).*

(Continued)

*Primary Examiner* — Alix E Eggerding
(74) *Attorney, Agent, or Firm* — Hartman Global IP Law; Gary M. Hartman; Domenica N. S. Hartman

(57) ABSTRACT

Separators, materials, and processes for producing electrochemical cells, for example, lithium (Li) metal batteries, and electrochemical cells produced therefrom. Such a separator includes a permeable membrane formed of a first polymer that is hydrophobic and has oppositely-disposed first and second surfaces, a second polymer that is hydrophilic and is incorporated into the first surface of the first polymer so that the first surface of the first polymer is a hydrophilic surface, and a conductive composite layer on the hydrophilic surface. The composite layer contains at least one layer of a carbonaceous material and an aqueous binder that binds the carbonaceous material together and to the hydrophilic.

19 Claims, 16 Drawing Sheets

(51) Int. Cl.
*H01M 10/0568* (2010.01)
*H01M 50/411* (2021.01)
*H01M 50/431* (2021.01)

(56) References Cited

U.S. PATENT DOCUMENTS

| | | | | |
|---|---|---|---|---|
| 2009/0155689 | A1* | 6/2009 | Zaghib | H01M 4/366 |
| | | | | 429/231.95 |
| 2012/0295149 | A1* | 11/2012 | Xie | H01M 50/409 |
| | | | | 977/734 |
| 2018/0198156 | A1* | 7/2018 | Lee | H01M 50/446 |
| 2019/0326576 | A1* | 10/2019 | Xue | H01M 50/409 |
| 2020/0259150 | A1* | 8/2020 | Shahbazian-Yassar | |
| | | | | H01M 50/403 |

OTHER PUBLICATIONS

Wang, D., Zhao, Z., Yu, L., Zhang, K., Na, H., Ying, S., Xu, D. and Zhang, G. (2014), Polydopamine Hydrophilic Modification of Polypropylene Separator for Lithium Ion Battery. J. Appl. Polym. Sci., 131, 40543, doi: 10.1002/app.40543 (Year: 2014).*

* cited by examiner

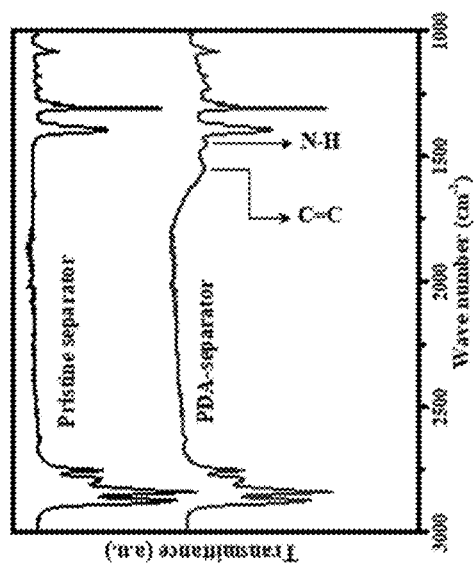
FIG. 4A
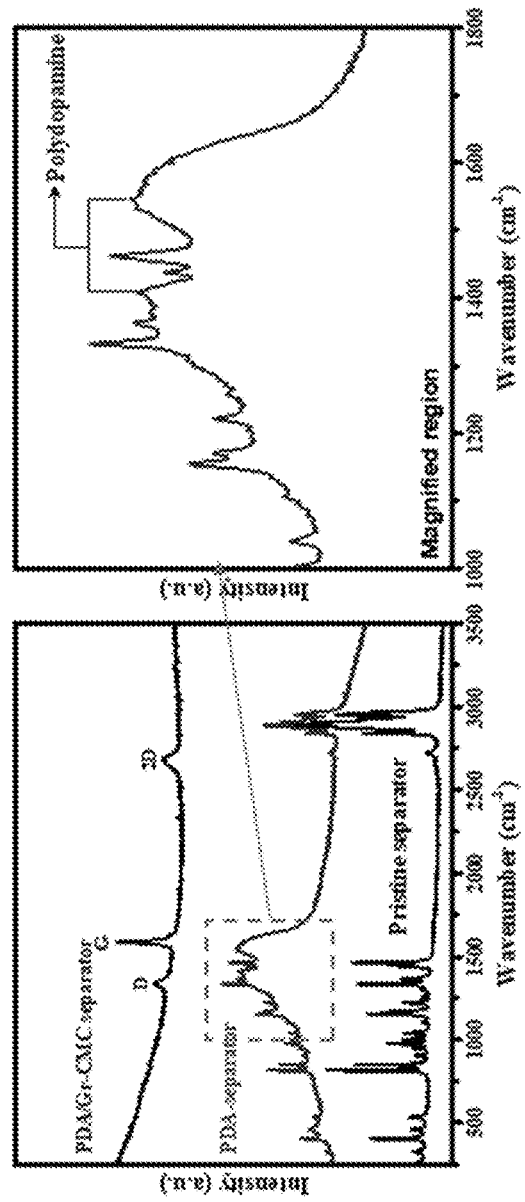
FIG. 4C
FIG. 4B

SEPARATORS FOR ELECTROCHEMICAL CELLS AND METHODS OF MAKING THE SAME

CROSS-REFERENCE TO RELATED APPLICATIONS

This application claims the benefit of U.S. Provisional Application No. 62/819,153, filed Mar. 15, 2019, the contents of which are incorporated herein by reference.

STATEMENT REGARDING GOVERNMENT FUNDING

This invention was made with government support under N00014-18-1-2397 awarded by the Office of Naval Research. The government has certain rights in the invention.

BACKGROUND OF THE INVENTION

The present application generally relates to storage devices, as nonlimiting examples batteries for use in electronic and electric vehicle applications. The invention particularly relates to components, materials, and processes capable of enhancing the life and capacity of electrochemical cells, especially lithium (Li) metal batteries, and electrochemical cells produced therefrom.

This section introduces aspects that may help facilitate a better understanding of the disclosure. Accordingly, these statements are to be read in this light and are not to be understood as admissions about what is or is not prior art.

With the advent of high-performing electronic applications (e.g., portable devices, electric vehicle, etc.), substantial efforts have been devoted to developing high energy density and long cycle life energy storage devices. Previous anode research with focus on carbonaceous materials (e.g., graphite, hard carbon, etc.) have shown promising results and consequently carbonaceous materials have been adopted in the industrial battery market. However, these anode electrodes have intrinsic limitations in achieving a higher energy density at an affordable cost. To address such challenges, Li metal batteries have received a great deal of attention from diverse fields and institutes. This is because of lithium metal's high theoretical capacity (3860 mAh $g^{-1}$), low negative redox potential (−3.04 versus the standard hydrogen electrode), low density (0.59 g $cc^{-1}$), and possible utilization in high energy storage devices (as nonlimiting examples, Li—S and Li—$O_2$ batteries).

However, the practical use of Li metal electrode in the industrial battery market has been impeded by certain challenges, particularly those associated with low Coulombic efficiency and safety risks resulting from short circuiting caused by dendritic Li growth. To address these issues and the practical utilization of Li metal electrodes in advanced energy storage systems, a variety of strategies have been approached to enhance the electrochemical performance of Li metal batteries and reduce the risk of short-circuiting, including exploring new electrolyte additives, adopting protective layer to Li metal surfaces, and designing functional membranes. Among these strategies is the surface alteration of separators utilized in Li metal batteries. As known in the art, separators are permeable membranes that physically separate the anode and cathode of a battery to prevent electrical short circuits while permitting the transport of ionic charge carriers therebetween. Surface alterations of standard polypropylene (PP) separators with multifunctional materials have been shown to improve the cycle performance and Coulombic efficiency of Li metal batteries, making it an ideal approach to address the systemic issues underlying the use of Li metal anodes.

Optimization of battery electrolytes with new additives requires complicated and expensive procedures. In addition, there are some problematic issues with electrolyte decomposition, causing capacity fading. Adopting a protective layer to Li metal using deposition techniques (sputtering and atomic layer deposition) also requires elaborate and expensive procedures and are not scalable. Hence, these critical challenges inhibit the practical use of Li metal in commercial batteries.

BRIEF DESCRIPTION OF THE INVENTION

The present invention provides separators, materials, and processes for producing electrochemical cells, for example, lithium (Li) metal batteries, and electrochemical cells produced therefrom.

According to one aspect of the invention, a separator for use in an electrochemical cell includes a permeable membrane formed of a first polymer that is hydrophobic and has oppositely-disposed first and second surfaces, a second polymer that is hydrophilic and is incorporated into the first surface of the first polymer so that the first surface of the first polymer is a hydrophilic surface, and a conductive composite layer on the hydrophilic surface. The composite layer contains at least one layer of a carbonaceous material and an aqueous binder that binds the carbonaceous material together and to the hydrophilic surface.

According to another aspect of the invention, an electrochemical cell includes an anode, a cathode, a liquid electrolyte, and a separator preferably comprising elements as described above.

According to yet another aspect of the invention, a method of making a separator for use in an electrochemical cell includes the steps of providing a permeable membrane formed of a first polymer that is hydrophobic and has oppositely-disposed first and second surfaces, incorporating into the first surface of the first polymer a second polymer so that the first surface of the first polymer is a hydrophilic surface, and applying a conductive composite layer on the hydrophilic surface, wherein the composite layer contains at least one layer of a carbonaceous material and an aqueous binder that binds the carbonaceous material together and to the hydrophilic surface.

Technical aspects of separators, electrochemical cells, and methods having features as described above preferably include the ability to enhance battery cycle performance and electrochemical stability of a Li metal electrode.

Other aspects and advantages of this invention will be appreciated from the following detailed description.

BRIEF DESCRIPTION OF DRAWINGS

Some of the figures shown herein may include dimensions. Further, some of the figures shown herein may have been created from scaled drawings or from photographs that are scalable. It is understood that such dimensions or the relative scaling within a figure are by way of example, and not to be construed as limiting.

FIG. 4A is a graph plotting an FT-IR Spectra of a pristine PP separator and a PDA-modified separator.

FIGS. 4B and 4C are graphs plotting Raman Spectra Analyses of a pristine PP separator, a PDA-modified separator, and a PDA/Gr-CMC separator.

DETAILED DESCRIPTION OF THE INVENTION

Figure 1:
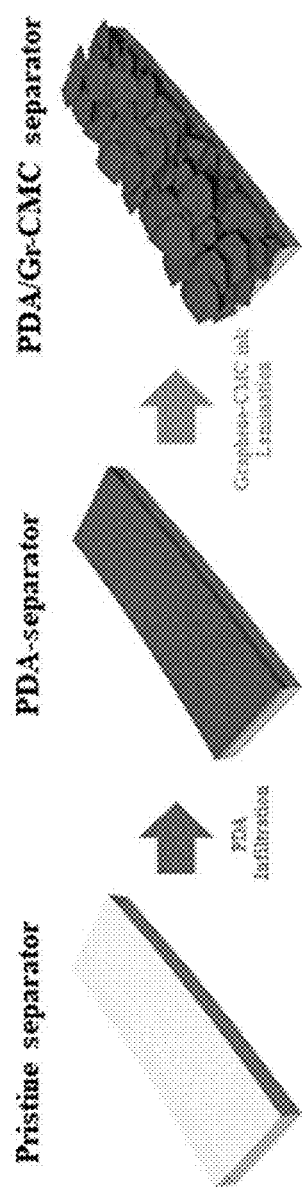
FIG. 1 schematically represents a conventional ("pristine") separator, a separator produced from a pristine separator to have one surface that is modified with PDA (polydopamine) to form a PDA-modified separator, and a PDA/Gr (graphene)-CMC (carboxymethylcellulose) separator produced from the PDA-modified separator.

For the purposes of promoting an understanding of the principles of the present disclosure, reference will now be made to embodiments illustrated in the drawings and specific language will be used to describe the same. It will nevertheless be understood that no limitation of the scope of the disclosure is thereby intended.

As previously noted, lithium (Li) metal batteries can suffer from intrinsic issues associated with poor Coulombic efficiency (the efficiency by which lithium electrons are reversibly transferred) and dendritic Li growth. This disclosure describes multifunctional multilayer membranes produced by depositing a dual layer on one surface of a permeable membrane formed of a first polymer that is hydrophobic. The dual layer is formed by incorporating a second polymer into the surface of the membrane so that the surface is a hydrophilic surface, and applying a conductive composite layer on the hydrophilic surface, wherein the composite layer contains at least one layer of a carbonaceous material and an aqueous binder capable of binding the carbonaceous material together and to the hydrophilic surface formed by the second polymer. In investigations leading to the present invention, the first polymer (permeable membrane) was polypropylene (PP), the second polymer was a polydopamine (PDA) layer, and the conductive composite layer was a graphene-carboxymethyl cellulose (Gr-CMC) layer, creating what is referred to herein as a PDA/Gr-CMC separator. The investigations evidenced the ability of a PDA/Gr-CMC separator to enhance the cycle performance and electrochemical stability of a Li metal electrode. The multifunctional multilayer membrane was also determined to be capable of curbing the growth of Li dendrites and the propagation of grown Li dendrites towards the counter electrode. In addition, the Gr-CMC layer was shown to promote desirable characteristics including wettability, electrical conductivity, and Li storage capacity. These benefits facilitated excellent and effective electrochemical reactions and kinetics in both Li/Cu half-cells and Li/LiFePO$_4$ (LFP) full cells. When the PDA/Gr-CMC separator was employed in either system, cycle stability and Coulombic efficiency were dramatically improved and the interfacial impedance between the electrode and the separator was significantly reduced. Electrochemical stability tests at 0° C. further demonstrated the positive potential of the PDA/Gr-CMC separator for facilitating the stable operation of Li metal batteries. The approach of this disclosure not only can serve as an effective way of enhancing the life and capacity of Li metal batteries, but also can broaden the material options for the development of advanced Li metal batteries.

In the investigations, one surface of a conventional ("pristine") PP separator (Celgard 2500) was functionalized by polymerizing dopamine, i.e., polydopamine (PDA), to contribute hydrophilicity to the otherwise hydrophobic PP separator and reduce the pore diameter of the PP separator. It was previously studied that a thin PDA layer has a capability to improve the electrolyte wettability and ionic conductivity of a PP separator and thus affect the electrochemical stability and performance of Li-ion batteries. A layer of graphene (Gr) was applied to the PDA-modified separator (PDA-modified separator) in order to improve the capacity of Li storage, mitigate the volume change of electrodes during recharging, lower the local current density being applied to the counter electrode, and provide an additional conductive path to the counter electrode. With the layer of graphene, an aqueous binder of carboxymethyl cellulose (CMC) was employed to enable an aqueous process and contribute a hydrophilic property to the resulting Gr-CMC layer. The contributions of the PDA layer and the Gr-CMC layer within a multilayer membrane on a separator (PDA/Gr-CMC separator) were determined to synergistically and significantly improve-the cycle stability and Coulombic efficiency of a Li/Cu cell over 200 cycles. In addition, the multilayer membrane demonstrated an ultra-stable cycle retention and improved specific capacity of a Li/LiFePO$_4$ (LFP) full cell over 1000 cycles, when compared to a full cell with only a PP separator. These benefits were attributed to main three benefits of the PDA/Gr-CMC multilayer membrane: a) an improved electrolyte wettability, b) an additional conductive path to the counter electrode, and c) an effectively reduced local current density aided by the layer of graphene. The strategy of adopting a dual layer comprising a hydrophilic graphene layer and a PDA layer on a PP separator not only improved Li storage capacity but also reinforced the electrochemical stability of Li metal cells equipped therewith. Consequently, this approach establishes a new way of stabilizing a Li metal electrode towards the practical development of Li metal batteries.

FIG. 1 schematically represents the fabrication of a PDA-modified separator from a "pristine" (conventional PP) separator, and the fabrication of a PDA/Gr-CMC separator from a PDA-modified separator. For investigations leading to the present invention, PDA-modified separators were prepared by altering the surfaces of conventional PP separators by contacting one surface of the PP separator in a prepared dopamine solution (10 mM) using co-solvents of methanol and Tris-buffer solution (pH 8.5). After twelve hours, the processed separators were removed from the solution, washed with plentiful DI water, and dried overnight in a convection oven at 50° C. The thicknesses of the deposited PDA were in a range of about 1 to about 5 micrometer. Some of the PDA-modified separators were then used to produce PDA/Gr-CMC separators. An aqueous slurry for graphene coating was prepared by dispersing 90 mg of a graphene nanosheet powder and 10 mg of a CMC binder (sigma Aldrich) in DI water using a planetary mixer (Thinky). The resulting graphene-CMC (Gr-CMC) slurry was cast onto some of the PDA-modified separators and then dried in a convection oven at a temperature of 50° C. for 24 hours to form a layer of graphene on the PDA-modified separators. Additionally, an nMP-based slurry for graphene coating was prepared by homogenizing 90 mg of graphene nanosheets and 10 mg of polyvinylidene fluoride (PVdF) with N-Methyl-2-pyrrolidone (nMP) in a mixer. The resulting nMP-based slurry was then coated on some of the remaining PDA-modified separators and dried overnight in a convection oven at a temperature of 50° C. to form a layer of graphene on the PDA-modified separators.

Li/Cu half-cells and Li/LFP full cells were fabricated for testing with either a conventional PP separator, or a PDA-modified separator, or a PDA/Gr-CMC separator. Li metal films 12 mm in diameter and 150 µm in thickness and Cu foils 12 mm in diameter and 12 µm in thickness were used in the fabrication process. The tests used an electrolyte of 1.0 M $LiPF_6$ ethylene carbonate/diethyl carbonate (EC:DEC=1:1 by volume). The areal Li plating capacity was set to 1 mAh $cm^{-2}$ and the cutoff potential for Li striping was 1.0 V. $LiFePO_4$ (LFP) cathode electrodes were prepared by mixing 80 wt. % LFP powder, 10 wt. % super P conductive carbon, and 10 wt. % PVdF in the nMP solvent, and then casting the mixture on an Al foil. Once the LFP-coated Al foil was fully dried in a convection oven (80° C.), it was punched into a circular electrode having a diameter of 12 mm. The same amount of 1.0 M $LiPF_6$ EC:DEC (1:1 by volume) electrolyte was used to compare the electrochemical performances of each separator in the Li/LFP full cells.

Surface images of a PP separator, a PDA-modified separator, and a PDA/Gr-CMC separator were analyzed by a FESEM (NanoSEM 450). The electrochemical performances of cells with different separators were evaluated by a battery cycler (MTI). EIS studies were carried out by an potentiostat/galvanostat (Gamry) within the frequency range of 100 kHz to 0.1 Hz at an amplitude of 5 mV. Raman spectra of a PP separator, a PDA-modified separator, and a PDA/Gr-CMC separator were measured by a Raman Microscope (ThermoScientific) using 532-nm laser. Fourier-transform infrared spectroscopy (FT-IR) spectra were recorded in the range 3000-1000 $cm^{-1}$ with a FT-IR Spectrometer (FT-IR 4200). A Brunauer-Emmett-Teller (BET) measurement was performed to measure the surface area of a graphene nanosheet, showing that the specific surface area of the graphene nanosheet was about 62 $m^2$ $g^{-1}$. After repetitive Li plating/stripping cycles, the cycled PP separator was observed by SEM measurement.

Figure 2A:
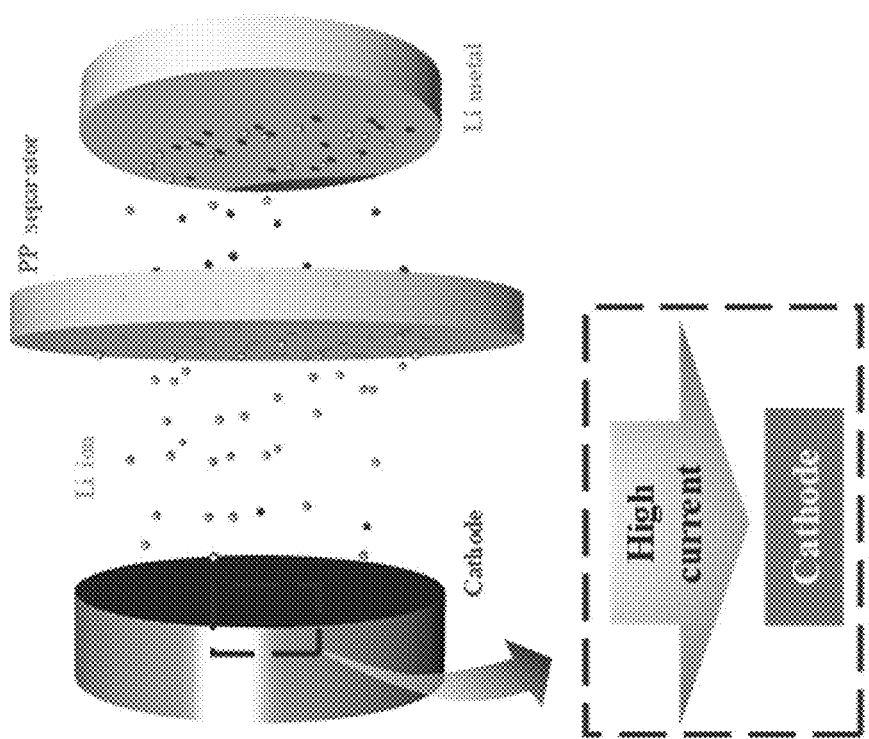
FIGS. 2A and 2B schematically illustrate the role of, respectively, a pristine (polypropylene, PP) separator and a PDA/Gr-CMC separator on electrochemical reactions during discharging of an electrochemical cell.
Figure 2B:
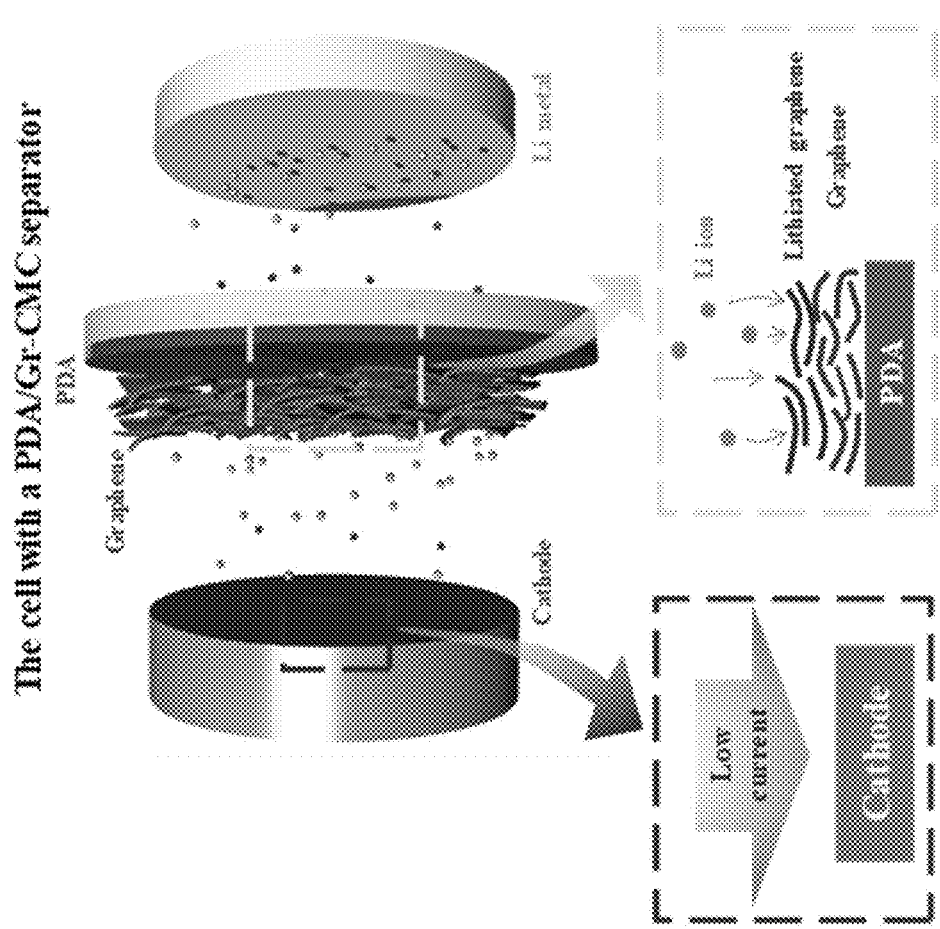

FIGS. 2A and 2B schematically compare how the PP separators and PDA/Gr-CMC separators, respectively, affect the local current density being applied to the LFP cathode electrodes during discharging. When high current (>1 mA $cm^{-2}$) is applied to a cell with a PP separator, all the applied current contributes to the electrochemical reactions on the cathode electrode (or counter electrode), giving rise to relatively poor electrochemical kinetics and reactions since comparatively high current density is applied to the cell. In the case of a cell with a PDA/Gr-CMC separator, some portion of the applied current participates in the lithiation-delithiation of the graphene layer, which relatively reduces the local current density being applied to the cathode electrode. The reduced current density enhances the entire electrochemical stabilities and performances of a full cell. Moreover, the graphene layer offers an additional conductive pathway to the counter electrode, facilitating the enhanced electrochemical reactions of the cathode electrode.

Figure 3A:
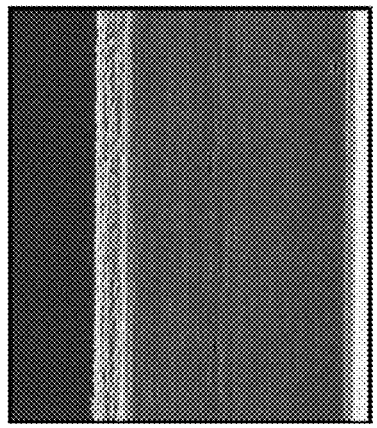
FIGS. 3A through 3C are SEM images of a pristine separator, a PDA-modified separator, and a cross-section of the PDA-modified separator, respectively.
Figure 3B:
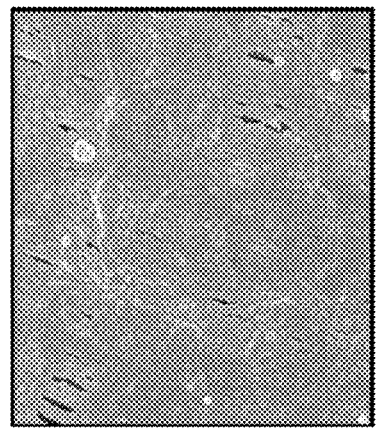
Figure 3C:
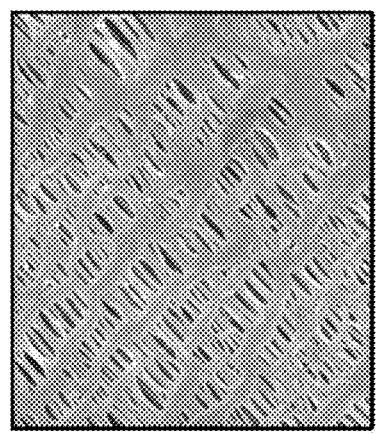
Figure 3D:
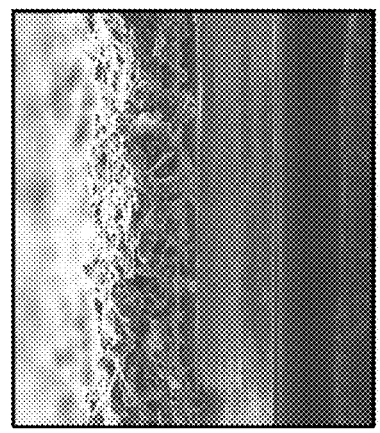
FIGS. 3D and 3E are SEM images of a PDA/Gr-CMC separator.
Figure 3E:
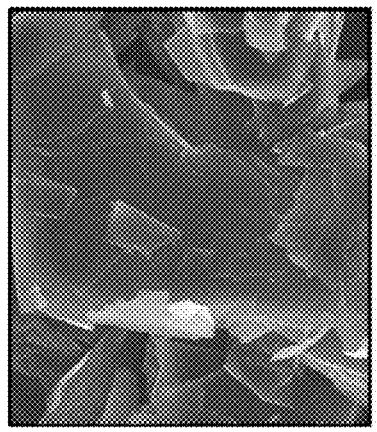
Figure 3F:
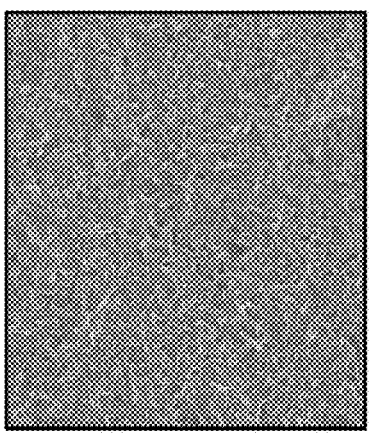
FIG. 3F is an SEM image of a cross-section of the PDA/Gr-CMC separator.

As depicted in FIG. 3A, the PP separators had plenty of gaps and pores throughout their surfaces. FIG. 3B shows that after surface modification with PDA, a coarse coating layer covered the surface of the PP separator. Interestingly, FIG. 3C shows a 5 µm-thick PDA layer was formed within the top surface of a PP separator without a volume change, and as such may be described as having been wholly incorporated into the PP layer of the separator. FIGS. 3D and 3E show a PDA/Gr-CMC separator with an approximately 2 µm-thick layer of well-distributed graphene nanosheets on a PDA-modified separator. The combined thickness of the Gr-CMC layer on the PDA-modified separator shown in FIG. 3F is about 16 µm. In order to ascertain the formation of the PDA on the PP separator, Fourier-transform infrared spectroscopy (FT-IR) analysis was conducted. After the PDA layer formation, two distinct peaks appeared at 1549 $cm^{-1}$ and 1450 $cm^{-1}$, corresponding to C=C resonance vibration and N—H bending vibration, respectively (FIG. 4A). Raman spectroscopy analysis further supports the successful formation of the PDA layer on the PP separator (FIGS. 4B and 4C). Two clear peaks assigned to 1408 and 1546 $cm^{-1}$ were derived from the aromatic rings of PDA. The main peak positions at D (1338 $cm^{-1}$) and G (1584 $cm^{-1}$) indicate the presence of a graphene layer on the PDA-modified separator.

Figure 5A:
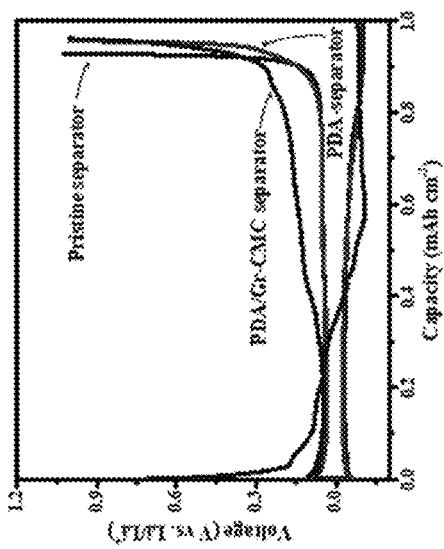
FIGS. 5A and 5B are graphs plotting first voltage profiles and charge-discharge cycle stabilities, respectively, of a Li/Cu half-cell with different separators.
Figure 5C:
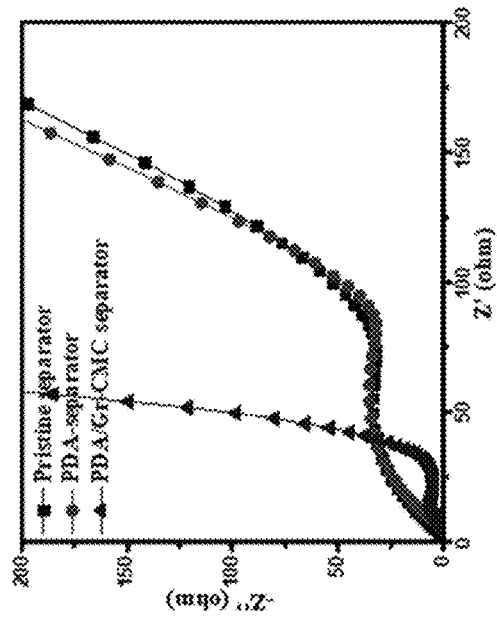
FIGS. 5C and 5D are Nyquist plots and a graph plotting rate capability, respectively, of Li/Cu half-cells with different separators.
Figure 5B:
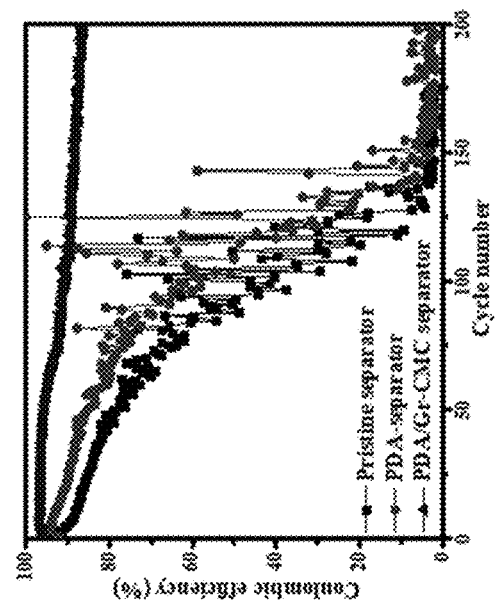

To investigate how the PDA layer with and without the Gr-CMC layer affects the electrochemical stability and performance of Li metal batteries, Li—Cu half-cells with a "pristine" (conventional PP) separator, with a PDA-modified separator, and with a PDA/Gr-CMC separator were tested (FIGS. 5A through 5G). FIG. 5A presents the voltage profiles of Li plating/stripping in each cell. When negative current was applied, the potential dropped abruptly and went below 0 V, indicating a Li metal plating on the counter electrode (Cu foil). The Li/Cu cell with a PDA-modified separator had an analogous polarization gap with the Li/Cu cell with the pristine PP separator, implying that the PDA layer impregnated within the top part of the PP separator had little affect on the overall impedance of the cell. The cell with a PDA/Gr-CMC separator exhibited two clear potential plateaus at 0.18 V and 0.08 V. These plateaus were associated with the lithiation reaction of graphene. The Coulombic efficiencies, calculated from the proportion of the stripped Li to the plated Li, of each cell showed different electrochemical stabilities as cycle numbers increased (FIG. 5B). It has been previously reported that a conventional PP/PE separator has no capability to inhibit the dendritic Li growth and impede the propagation of grown Li dendrites, resulting in a poor cycle stability and performance. As expected from such previous studies, the Li/Cu cell with the pristine PP separator started to decay from the beginning and was eventually damaged at around the $125^{th}$ cycle. Relatively, the Li/Cu cell with a PDA-modified separator delivered much higher Coulombic efficiencies during 100 cycles than that of the cell with the pristine PP separator. This was attributed to the better electrolyte wettability than the pristine PP separator. Different from the two cells tested above, the Li/Cu cell with a PDA/Gr-CMC separator delivered ultra-stable Coulombic efficiencies over 200 cycles, which was attributed to the increased Li storage in the graphene layer and the reduced local current density being applied to the Cu foil. Photo images and SEM images of the cycled PDA/Gr-CMC separator showed that the surface morphology and color of the graphene layer had changed due to the Li insertion. The morphologies of cycled Li metal directly indicated the effect of PDA/Gr-CMC layer on reducing the local current density associated with Li dendrite growth. FIG. 5C plots the result of electrochemical impedance spectroscopy (EIS) measurement, which shows that the charge transfer resistance, defined as a diameter of semicircle, of electrodes exhibited different values. Among these cells, the Li/Cu cell with a PDA/Gr-CMC separator exhibited the smallest charge transfer impedance due to the enhanced electrolyte wettability and the enhanced electrochemical kinetics by the Gr-CMC layer. By contrast, the Li/Cu cells with the pristine PP separator and with a PDA-modified separator exhibited an analogous charge transfer resistance of about 80Ω.

Figure 5D:
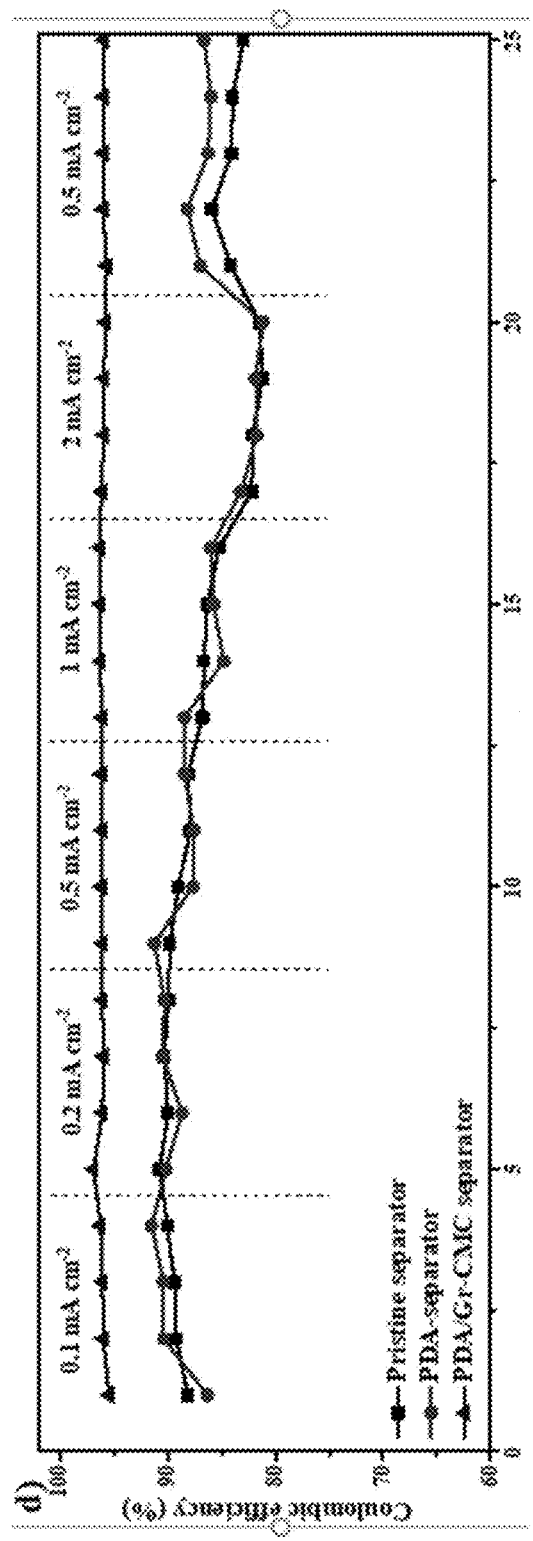
Figure 5E:
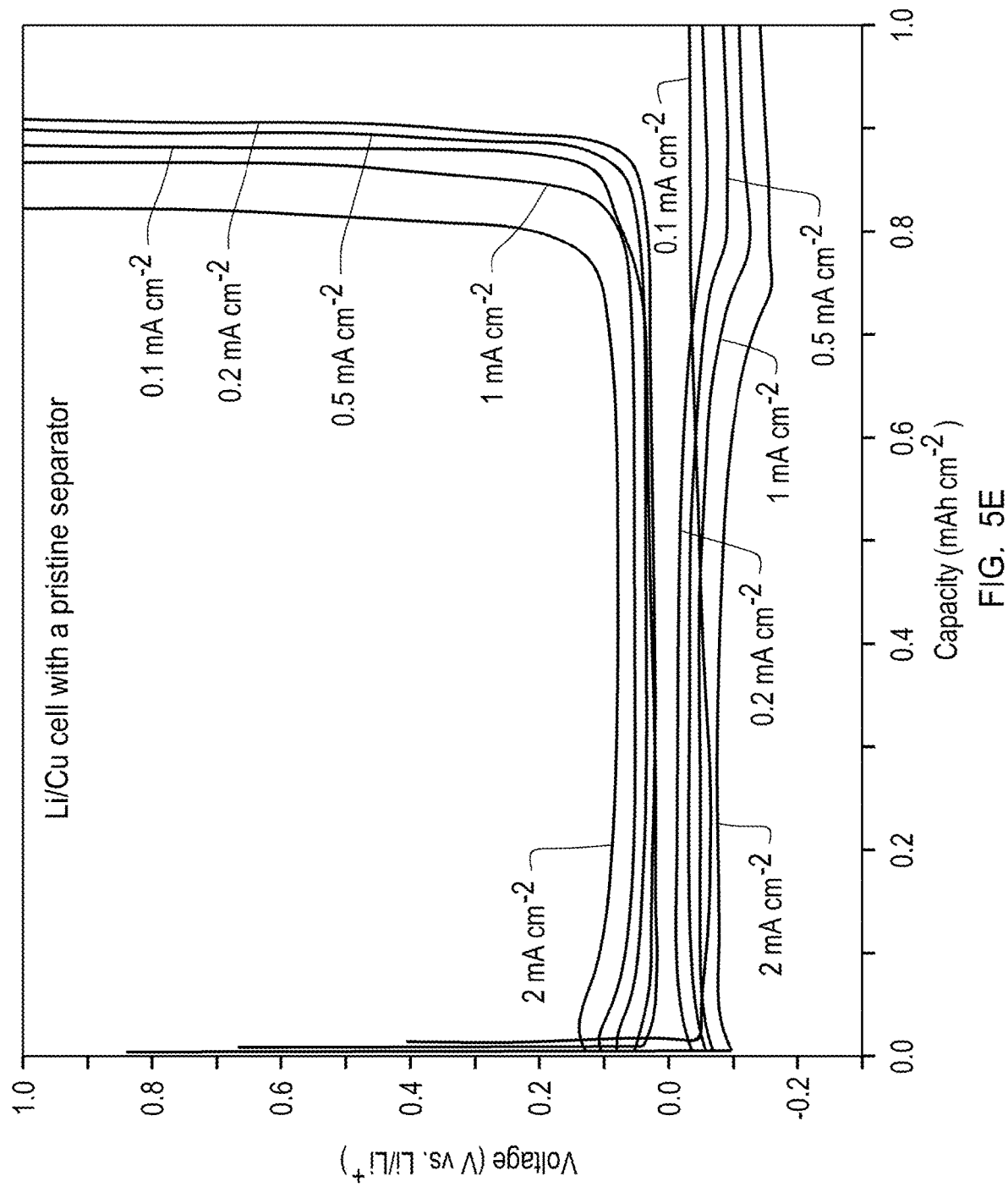
FIGS. 5E through 5G are graphs plotting voltage profiles of Li/Cu cells having a pristine PP separator, a PDA-modified separator, and a PDA/Gr-CMC separator, respectively, at different current densities.
Figure 5F:
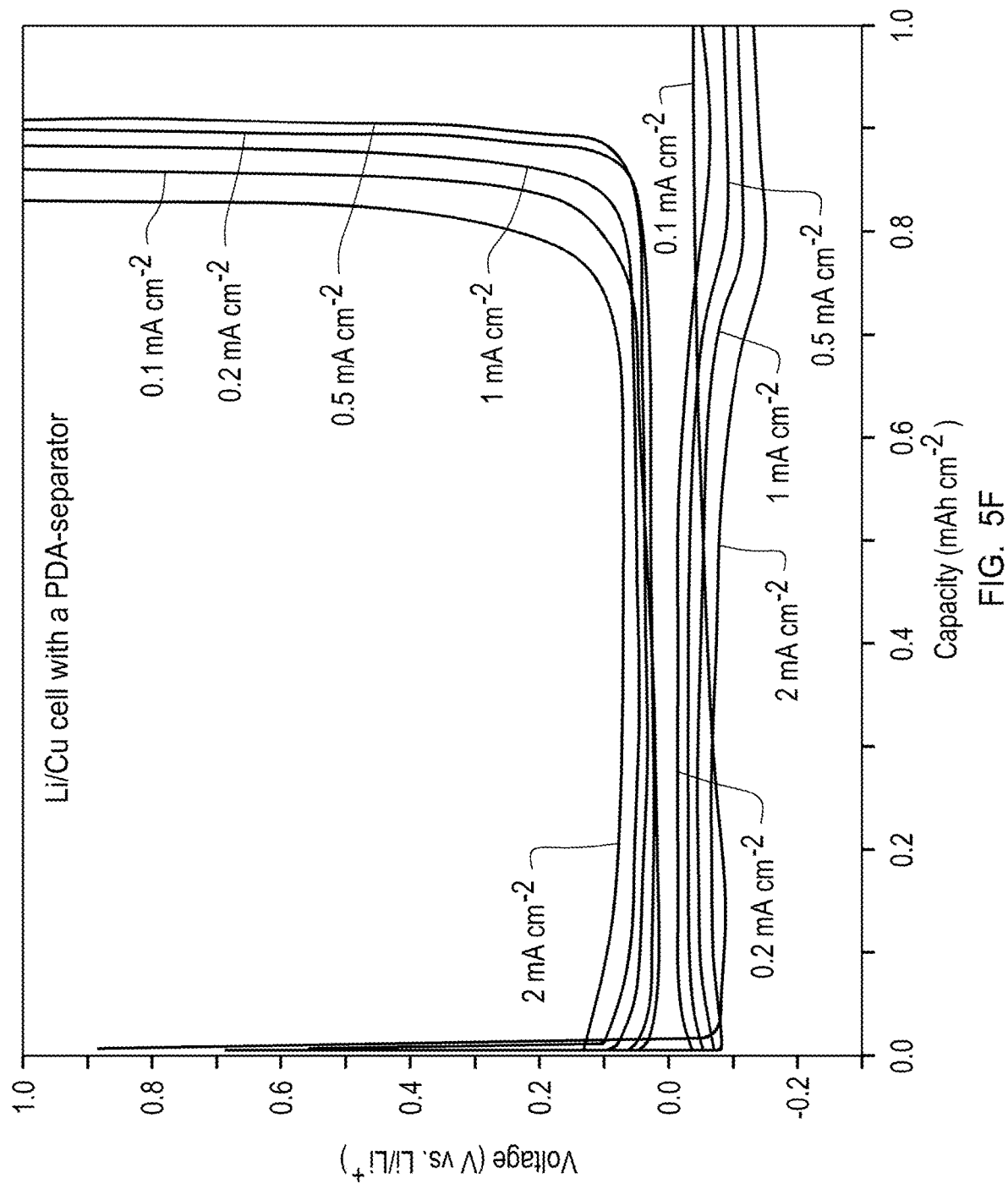
Figure 5G:
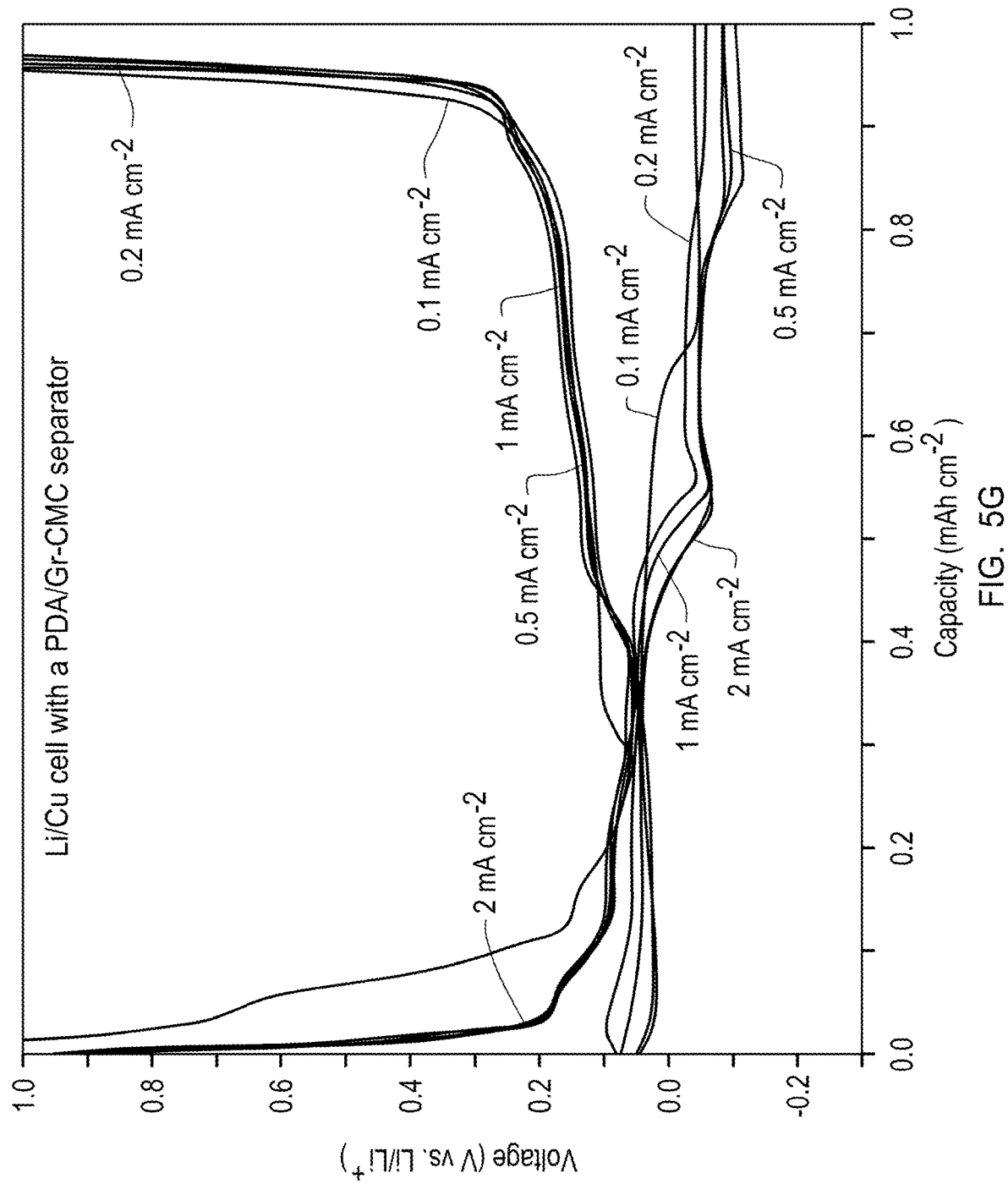

In order to ascertain how the Gr-CMC layer influences on the electrochemical reactions and kinetics under different current levels, each cell was tested by increasing the current levels from 0.1 mA cm$^{-2}$ to 2 mA cm$^{-2}$ (FIG. 5D). Each cell with a pristine PP separator and with a PDA-modified separator presented a comparable tendency of declining Coulombic efficiency as the current density increases. In contrast, the Li/Cu cell with a PDA/Gr-CMC revealed excellent and ultra-stable Coulombic efficiencies without noticeable decay even at different areal current levels from 0.1 to 2 mA cm$^{-2}$. As evidenced by FIG. 5G, the Li/Cu cell with a PDA/Gr-CMC separator showed a small polarization change as the current density increases, indicating that the Gr-CMC layer facilitated excellent and effective electrochemical reactions. The other two cells exhibited a much larger polarization at high current densities, as presented in FIGS. 5E and 5F.

Figure 6A:
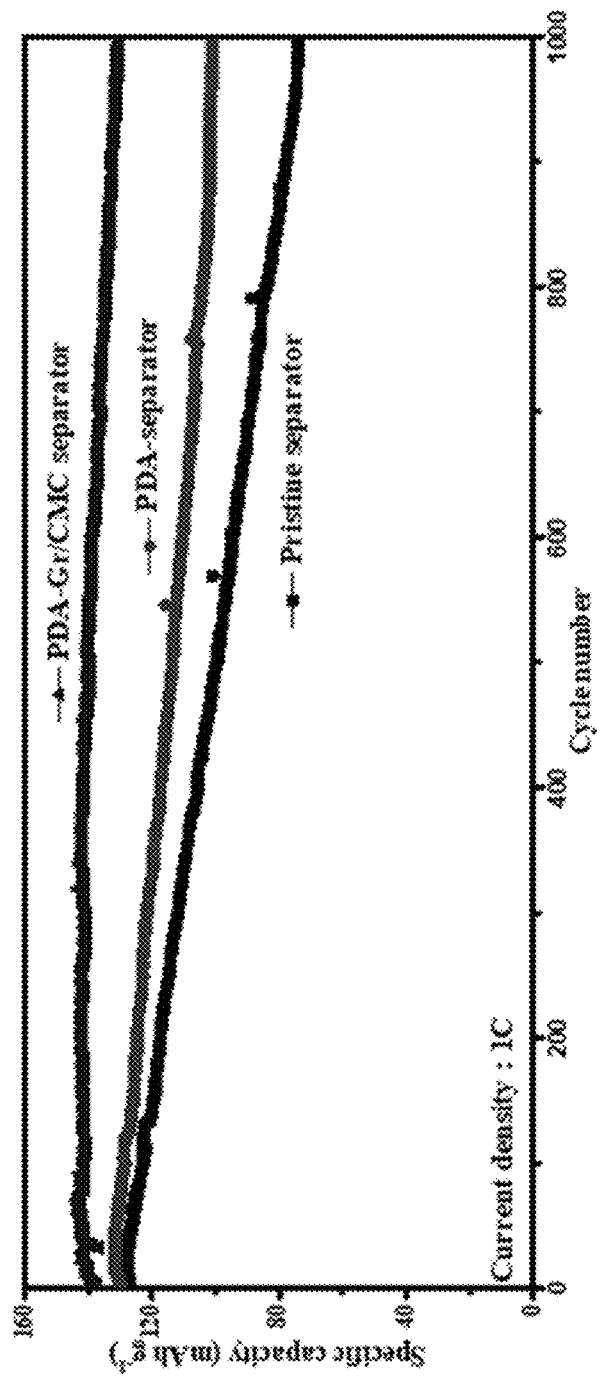
FIGS. 6A through 6C are graphs plotting cycle performance, initial voltage profile, and the $1000^{th}$ voltage profile, respectively, of Li/LFP full cells with different separators.
Figure 6C:
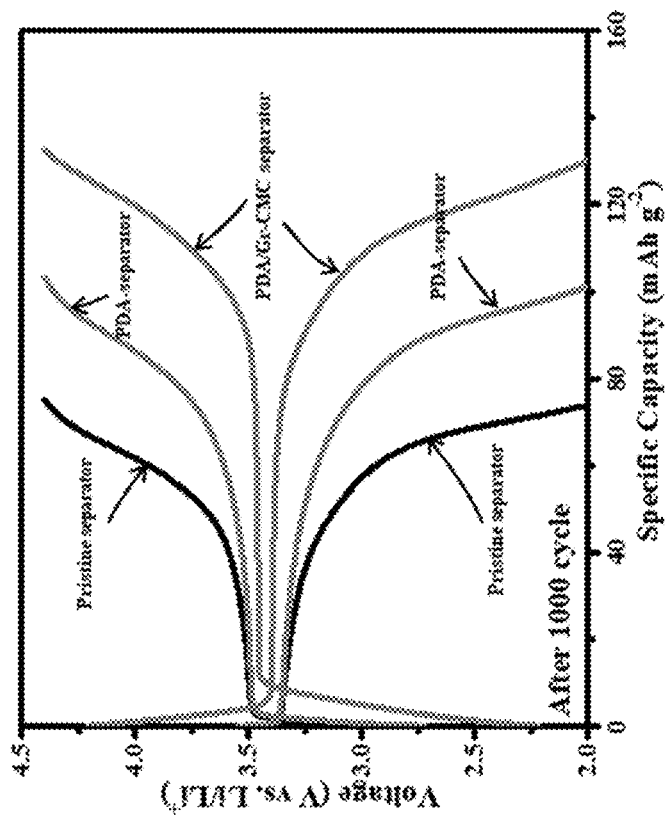
Figure 6B:
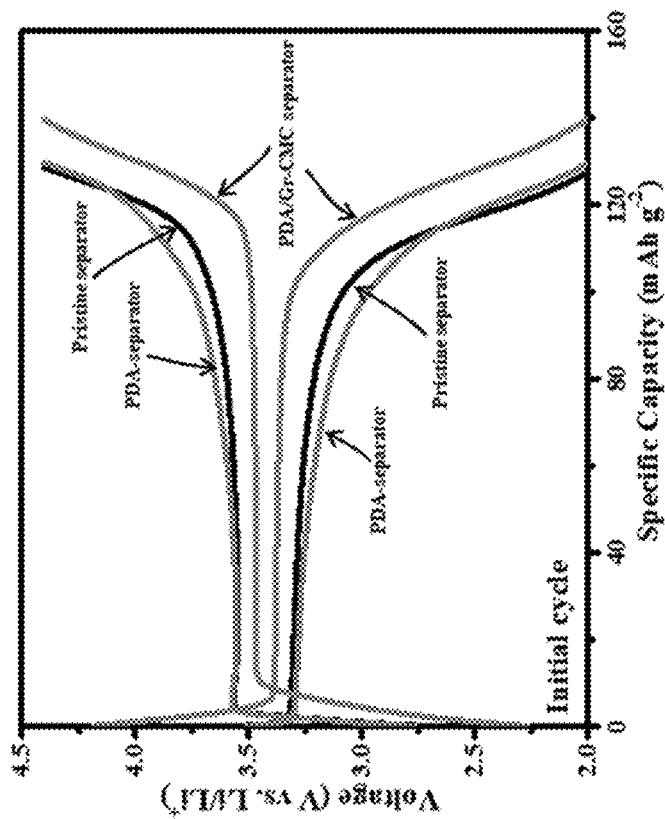
Figure 6D:
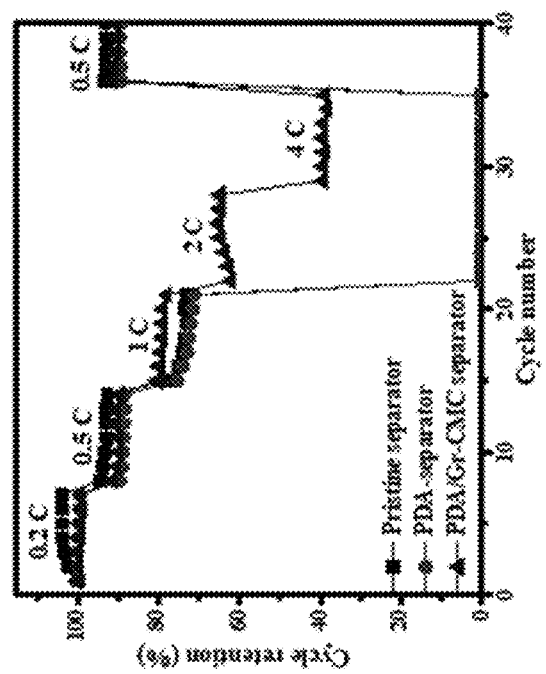
FIGS. 6D and 6E are graphs plotting rate retention and Nyquist plots, respectively, of Li/LFP full cells with different separators.
Figure 6E:
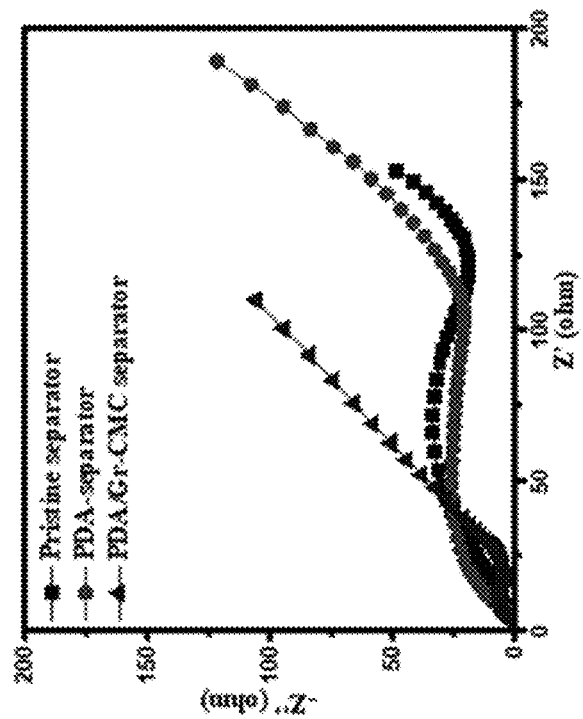

In order to directly demonstrate the practical potential of the PDA/Gr-CMC separator in a full cell and see how the separator affects the electrochemical reactions under different conditions, LiFePO$_4$ (LFP) cathode electrodes with high mass loading (14.5 mg cm$^{-2}$) were coupled with Li metal electrodes and tested as full cells (FIGS. 6A through 6E). FIG. 6A presents the cycle performances of Li/LFP full cells with different separators. The initial discharge capacities of Li/LFP cells with a pristine PP separator, a PDA-modified separator and a PDA/Gr-CMC separator correspond to 127.17 mAh g$^{-1}$, 129.96 mAh g$^{-1}$ and 139.61 mAh g$^{-1}$, respectively (FIG. 6B). After 1000 cycles, the Li/LFP cells with a PDA/Gr-CMC separator retained its capacity of 130.21 mAh g$^{-1}$ without significant capacity fading. By contrast, the discharge capacity of the Li/LFP cells with a pristine PP separator and a PDA-modified separator decayed to 73.76 mAh g$^{-1}$ (with 57.99% of initial capacity) and 101.01 mAh g$^{-1}$ (with 77.72% of initial capacity), respectively, after 1000 cycles (FIGS. 6A and 6C). As shown in the voltage profiles of FIGS. 6B and 6C, the cell with a PDA/Gr-CMC separator exhibited the smallest polarization between discharge and charge curves among the three cells, which was concluded to be due to the enhanced electrical conductivity aided by the Gr-CMC layer. The rate performances of each cell provided further support for the conclusion that the Gr-CMC layer facilitated efficient electrochemical reactions and consequently led to excellent rate performances of the Li/LFP cell (FIG. 6D). A Nyquist plot of the Li/LFP cell with a PDA/Gr-CMC separator exhibited the smallest charge transfer resistance of 17.8Ω among the three electrodes (FIG. 6E). The results described were all ascribed to a synergistic contribution of a PDA layer and a Gr-CMC layer, which included excellent electrolyte wettability, improved electrical conductivity, and suppression of iron dissolution/diffusion within the cathodic side. These characteristics of the PDA/Gr-CMC separator were concluded to have enabled the ultra-stable and excellent electrochemical performances of the Li/LFP cell over 1000 cycles.

Figure 7A:
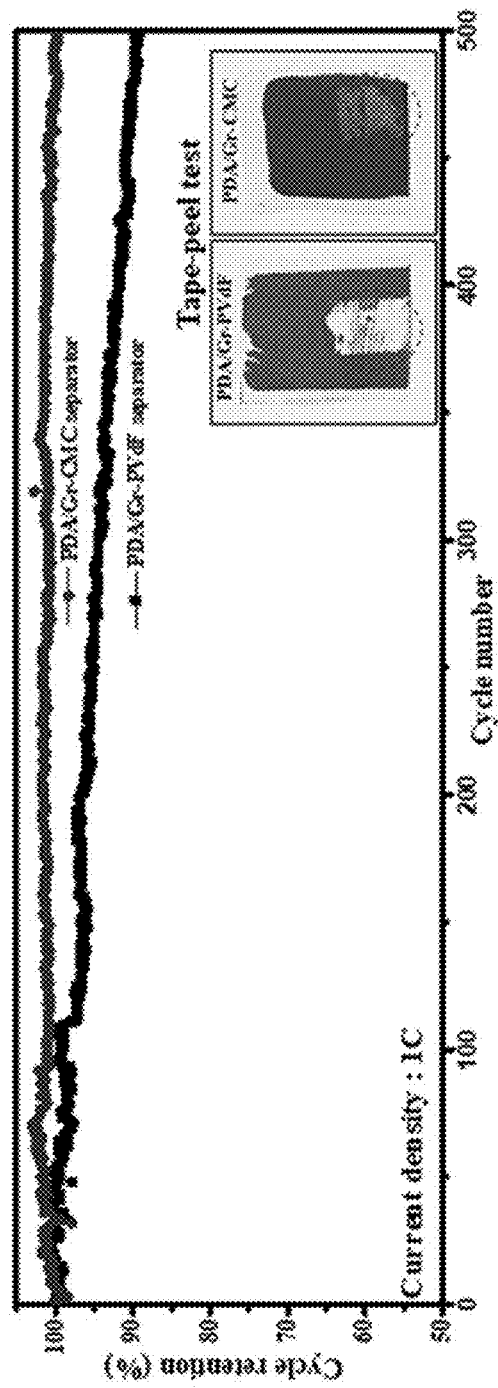
FIG. 7A is a graph plotting cycle retention of Li/LFP cells with a PDA/Gr-CMC separator and a PDA/Gr-PVdF separator, and images showing the results of adhesion tests via a simple tape-peel test.
Figure 7C:
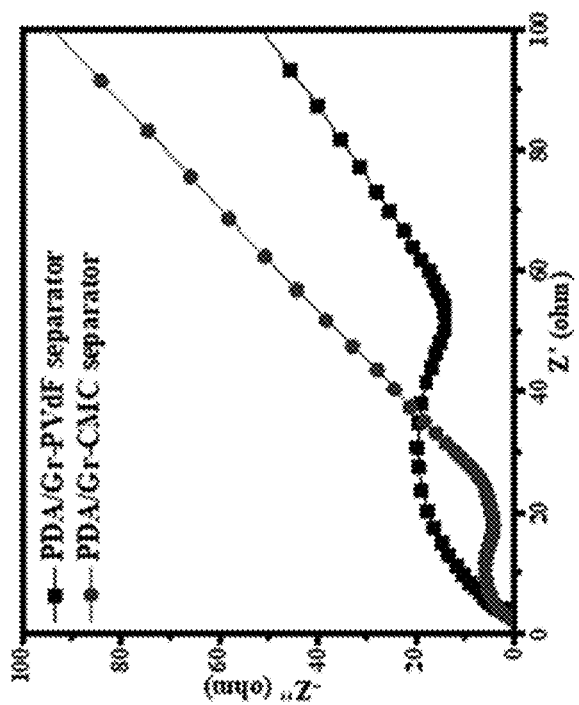
FIG. 7C contains Nyquist plots of Li/LFP cells with a PDA/Gr-CMC separator and a PDA/Gr-PVdF separator.
Figure 7B:
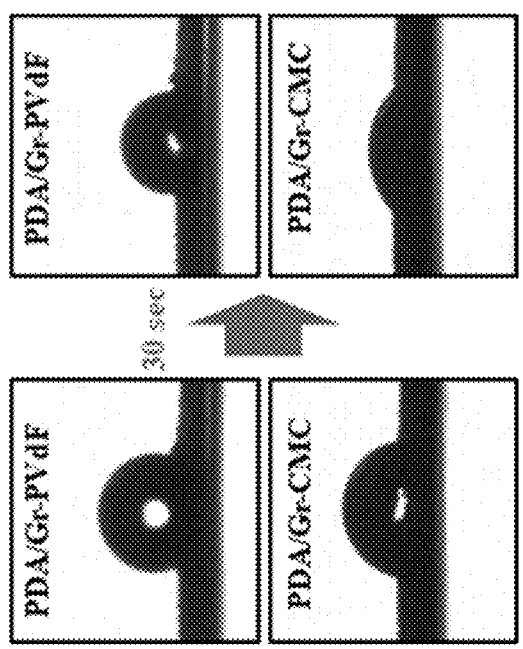
FIG. 7B contains images of an electrolyte wettability test.

FIGS. 7A through 7C show the influences of each CMC binder and PVdF binder on the physical and mechanical properties of the separators and correlations with the electrochemical performances in the Li/LFP full cells. As presented in FIG. 7A, the Li/LFP cell with a PDA/Gr-CMC separator delivered an outstanding cycle retention of nearly 100% over 500 cycles, which is superior to the cycle retention value of the Li/LFP cell with a PDA/Gr-PVdF (89.2% of initial capacity). To probe the capacity fading mechanism of Li/LFP cells in terms of the binder characteristic, mechanical adhesion between the PP separator and the graphene layer was compared via a simple tape-peel test (inset in FIG. 7A). After the peeling test of the PDA/Gr-PVdF separator with a sticky tape, the area applied with the tape was totally peeled off. By contrast, the PDA/Gr-CMC separator showed a relatively strong mechanical adhesion property against the tape-peel test. This can be indirectly correlated with the result of the long-term cycle performance of the Li-ion batteries because, in many cases, cycle stability is highly affected by the mechanical strength of a battery's components. After repetitive discharging/charging cycles, each cell was disassembled and the tested separators. The Gr-CMC layer of the PDA/Gr-CMC separator still maintained its integrity even after the harsh cycle test. However, the PDA/Gr-PVdF separator was severely damaged and a large portion of the Gr-PVdF layer had peeled from the PDA-modified separator. EDS mapping and SEM images showed the surface morphology and elements distribution. Elemental iron was clearly detected from the PDA/Gr-CMC layer because dissolved elemental iron was physically filtered by intact with the Gr-CMC layer. In contrast, elemental iron was not observed through the surface of the PDA/Gr-PVdF separator.

Tests were performed to explore the effect of the binder on the electrolyte wettability and its influence on the cell impedance. FIG. 7B contains images of the electrode wettability test with an electrolyte, 1.0 M LiPF$_6$ EC:DEC. As soon as the electrolyte was dropped onto a PDA/Gr-CMC separator, the separator was immediately wetted and the Gr-CMC layer was almost permeated by the electrolyte after 30 seconds. In contrast, a large sized electrolyte bead formed on a PDA/Gr-PVdF separator still stood on the surface of Gr-PVdF layer after 30 seconds. Extrapolating from these results, it was ascertained that the CMC binder enabled an efficient electrolyte permeation in the graphene layer and, consequently, it effectively reduced the interfacial impedance between the electrode and graphene layer. EIS analysis clearly indicated that the CMC-based graphene layer had much smaller charge transfer impedance due to its superior electrolyte wettability, in comparison with the PVdF-based graphene layer (FIG. 7C).

Figure 8B:
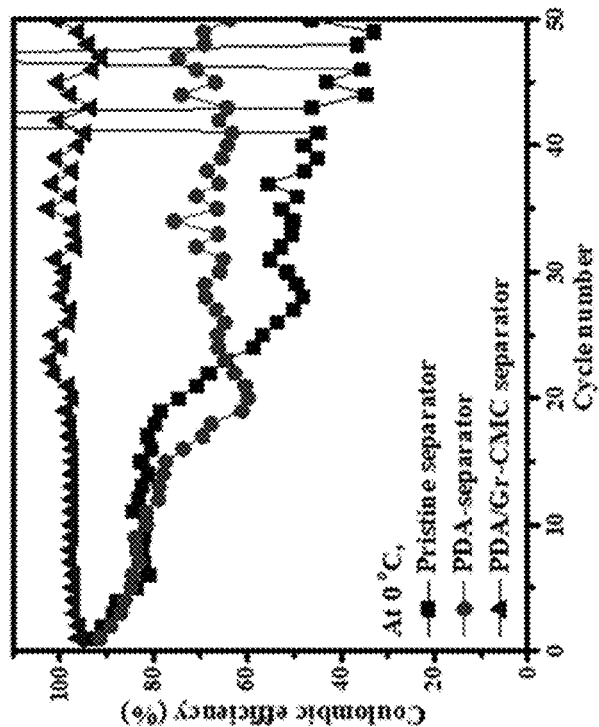
FIGS. 8A and 8B are graphs plotting initial voltage profiles and cycle performances, respectively, of electrochemical cells with different separators.
Figure 8A:
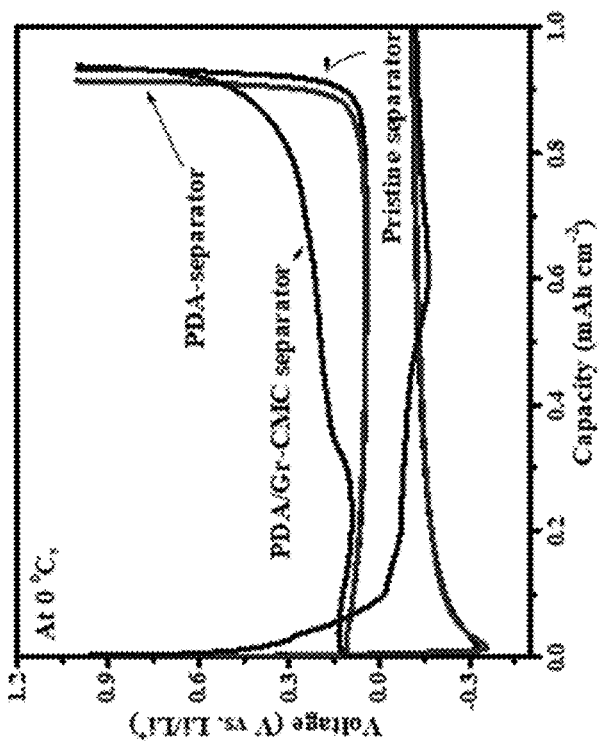

To follow the recent trend of operating Li-metal batteries at low temperatures, electrochemical stability tests were carried out with pristine PP separators, PDA-modified separators, and PDA/Gr-CMC separators at 0° C. (FIGS. 8A and 8B). FIG. 8A presents the initial voltage plots of each Li/Cu cell with different separators. At a low temperature of 0° C., each cell showed an increased polarization due to the slow electrochemical kinetics and increased impedance, in comparison with the cells tested at room temperature. The cell with the PDA/Gr-CMC separator still exhibited two clear voltage plateaus, except that the gap between oxidation/reduction potentials broadened. With the synergistic contribution of the PDA layer and the Gr-CMC layer, the cell with a PDA/Gr-CMC separator also exhibited a stable cycle performance over 50 cycles (FIG. 8B). In contrast, the cells with the pristine PP separator and the PDA-modified separator showed aggravated cycle performances due to the poor electrochemical kinetics and side reactions (such as accelerated Li dendrite growth). Throughout these results, the strong potential of the PDA/Gr-CMC separator for Li metal cells was successfully demonstrated even under harsh environments.

The discussion above evidences the successful fabrication of a separator provided with a multifunctional multilayer (trilayer) membrane comprising a PDA layer and a Gr-CMC layer on a PP layer of a separator, and the ability of the resulting separator to achieve highly stable Li metal. The membrane was fabricated by functionalizing the PP separator with the PDA layer, followed by depositing the Gr-CMC layer on the PDA layer. When the PDA/Gr-CMC separator was placed in a Li/Cu half-cell, the Coulombic efficiency was significantly enhanced over 200 cycles. Even when it was tested with a cathode electrode, i.e., LFP, the cycle retention and rate capability were dramatically improved, due to what was concluded to be the synergistic contributions of the PDA layer and the Gr-CMC layer. Electrochemical stability testing at 0° C. further demonstrated the strong potential of a PVdF/Gr-CMC separator for practical Li-metal batteries. Unlike previous strategies, the direct functionalization of the PP separator with a PDA layer not only enhanced the electrochemical stability of Li metal batteries, but also enabled aqueous processing (treatment). As such, the approach described above is believed to be able to effectively address many issues associated with the use of Li metal electrodes.

While the description above dealt with separators in which graphene nanosheets were used to produce a graphene layer, it should be recognized that a conventional PP separator can be modified by using, instead of graphene nanosheets, other carbonaceous materials such as, but not limited to, carbon nanofiber, carbon nanotubes, graphite powders, carbon spheres, etc. In such cases the preparation of the layer on the conventional PP separator may include, as a nonlimiting example, the steps of dispersing a nonlimiting amount of about 80 wt. % carbonaceous material and a non-limiting amount of about 20 wt % polyvinylidene fluoride (PVdF) binder in N-Methyl-2-pyrrolidone (nMP) solvent in order to prepare an ink, and then coating the conventional PP separator with the prepared ink via a tape-casting method followed by drying in a vacuum oven (for example, at a temperature in a range of 40° C. to 60° C.).

Based on the above, components, materials, and processes are provided for producing a separator suitable for use in an electrochemical cell, wherein the separator contains a multilayer membrane comprising a permeable membrane formed of a first polymer that is hydrophobic, a second polymer that is hydrophilic and introduced into a hydrophobic surface of the permeable membrane so that the surface is hydrophilic, and a conductive composite layer formed on the hydrophilic surface, wherein the composite layer contains at least one layer of a carbonaceous material and an aqueous binder capable of binding the carbonaceous material together and to the hydrophilic surface formed by the second polymer. A nonlimiting example of a suitable polymer for the first polymer is polypropylene. A nonlimiting example of a suitable polymer for the second polymer is polydopamine. In some embodiments of separators of this disclosure, the carbonaceous material preferably comprises multiple layers of graphene nanosheets each having a thickness of less than 300 nm. In some embodiments of separators of this disclosure, the total thickness of the carbonaceous material layer is in a range of 1 μm to 25 Examples of aqueous binders suitable for separators of this disclosure include, but are not limited to, CMC (carboxymethyl cellulose), PVdF (polyvinylidene fluoride), and PTFE (polytetrafluoroethylene).

An electrochemical cell incorporating a separator as described above includes an anode, a cathode, a liquid electrolyte, and the separator. In some embodiments, the anode of the electrochemical cell may comprise Li metal, the cathode may comprise Li-intercalated compounds, and/or the electrolyte may be 1M $LiPF_6$ EC:DEC.

A method of fabricating a separator as described above may include providing a first polymer that is hydrophobic, introducing a second polymer that is hydrophilic into the surface of the first polymer by exposing the hydrophobic surface thereof to a solution of a second polymer in a solvent wherein the second polymer percolates into the surface of the first polymer to produce in a hydrophilic surface, and then depositing a composite layer containing at least one layer of a carbonaceous material and an aqueous binder onto the hydrophilic surface, resulting in a separator for use in an electrochemical cell.

While the present disclosure has been described with reference to certain embodiments, it will be apparent to those of ordinary skill in the art that other embodiments and implementations are possible that are within the scope of the present disclosure without departing from the spirit and scope of the present disclosure. Thus, embodiments and implementations of the present invention are not be limited to the particular limitations described. Therefore, the scope of the invention is to be limited only by the following claims.

The invention claimed is:

1. A separator for use in an electrochemical cell, the separator comprising:
   a permeable membrane formed of a first polymer that has pores, is hydrophobic and has oppositely-disposed first and second surfaces;
   a second polymer that is hydrophilic and formed within the first surface of the first polymer so that the first surface of the first polymer is a hydrophilic surface, the second polymer being formed within the first surface of the first polymer without a volume change thereto so as to be wholly incorporated into the first polymer and reduce diameters of the pores of the first polymer; and
   a conductive composite layer on the hydrophilic surface, wherein the composite layer contains at least one layer of a carbonaceous material and an aqueous binder that binds the carbonaceous material together and to the hydrophilic.

2. The separator of claim 1, wherein the first polymer is polypropylene.

3. The separator of claim 1, wherein the second polymer is polydopamine having a thickness of about 1 to about 5 micrometers.

4. The separator of claim 1, wherein the carbonaceous material is at least one chosen from the group consisting of graphene nanosheets, carbon nanofibers, carbon nanotubes, graphite powders, and carbon spheres.

5. The separator of claim 1, wherein the carbonaceous material comprises multiple layers of graphene nanosheets.

6. The separator of claim 5, wherein the each of the graphene nanosheets has a thickness of less than 300 nm.

7. The separator of claim 1, wherein the composite layer has a thickness of 1 micrometer to 25 micrometers.

8. The separator of claim 1, wherein the aqueous binder is one of CMC (carboxymethyl cellulose), PVdF (polyvinylidene fluoride), and PTFE (polytetrafluoroethylene).

9. The separator of claim 1, wherein the aqueous binder is CMC (carboxymethyl cellulose).

10. An electrochemical cell comprising:
    an anode;
    a cathode;
    a liquid electrolyte; and
    a separator comprising a permeable membrane formed of a first polymer that has pores, is hydrophobic and has oppositely-disposed first and second surfaces, a second polymer that is hydrophilic and formed within the first surface of the first polymer without a volume change thereto so that the first surface of the first polymer is a hydrophilic surface and so that the second polymer is wholly incorporated into the first polymer and reduces diameters of the pores of the first polymer, and a conductive composite layer on the hydrophilic surface, wherein the composite layer contains at least one layer of a carbonaceous material and an aqueous binder that binds the carbonaceous material together and to the hydrophilic surface.

11. The electrochemical cell of claim 10, wherein the anode is Li metal.

12. The electrochemical cell of claim 10, wherein the cathode comprises Li-intercalated compounds.

13. The electrochemical cell of claim 10, wherein the electrolyte is 1M LiPF6 EC:DEC.

14. The electrochemical cell of claim 10, wherein the first polymer is polypropylene.

15. The electrochemical cell of claim 10, wherein the second polymer is polydopamine having a thickness of about 1 to about 5 micrometers.

16. The electrochemical cell of claim 10, wherein the carbonaceous material is at least one chosen from the group consisting of graphene nanosheets, carbon nanofibers, carbon nanotubes, graphite powders, and carbon spheres.

17. The electrochemical cell of claim 10, wherein the carbonaceous material is graphene nanosheets.

18. The electrochemical cell of claim 10, wherein the aqueous binder is one of CMC (carboxymethyl cellulose), PVdF (polyvinylidene fluoride), and PTFE (polytetrafluoroethylene).

19. A method of making a separator for use in an electrochemical cell, the method comprising:
    providing a permeable membrane formed of a first polymer that has pores, is hydrophobic and has oppositely-disposed first and second surfaces;
    incorporating a second polymer into the first surface of the first polymer so that the first surface of the first polymer is a hydrophilic surface and the second polymer is formed within the first surface of the first polymer without a volume change thereto so as to be wholly incorporated into the first polymer and reduce diameters of the pores of the first polymer; and
    applying a conductive composite layer on the hydrophilic surface, wherein the composite layer contains at least one layer of a carbonaceous material and an aqueous binder that binds the carbonaceous material together and to the hydrophilic surface.

* * * * *